United States Patent
Terashita

(10) Patent No.: US 10,285,027 B2
(45) Date of Patent: May 7, 2019

(54) COMMUNICATION APPARATUS

(71) Applicant: Brother Kogyo Kabushiki Kaisha, Nagoya-shi, Aichi-ken (JP)

(72) Inventor: Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/279,475

(22) Filed: Sep. 29, 2016

(65) Prior Publication Data
US 2017/0094441 A1  Mar. 30, 2017

(30) Foreign Application Priority Data
Sep. 29, 2015 (JP) .................. 2015-192158

(51) Int. Cl.
*H04W 4/00* (2018.01)
*H04W 4/50* (2018.01)
(Continued)

(52) U.S. Cl.
CPC ......... *H04W 4/50* (2018.02); *H04M 1/72519* (2013.01); *H04W 8/005* (2013.01);
(Continued)

(58) Field of Classification Search
CPC ... H04W 84/12; H04W 4/008; H04W 76/023; H04W 84/18; H04W 8/005; H04W 76/02
See application file for complete search history.

(56) References Cited

U.S. PATENT DOCUMENTS 7,899,439 B2  3/2011  Hibino
8,457,085 B2  6/2013  Izaki
(Continued)

FOREIGN PATENT DOCUMENTS

JP  2003-023391 A  1/2003
JP  2006-166245 A  6/2006
(Continued)

OTHER PUBLICATIONS

Wi-Fi Alliance Technical Committee P2P Task Group, "Wi-Fi Peer-to-Peer (P2P) Technical Specification", Version 1.1, pp. 1-159, 2010.

*Primary Examiner* — Dung Hong
(74) *Attorney, Agent, or Firm* — Banner & Witcoff, Ltd.

(57) ABSTRACT

A communication apparatus may determine whether a first external apparatus is a target apparatus by referring content of a predetermined area included in a first connection request in a case where the first connection request is received from the first external apparatus via a wireless interface under a state where the communication apparatus operates in a first operation mode, and establishes a first wireless communication with the first external apparatus in a case where it is determined that the first external apparatus is the target apparatus. A wireless communication with the first external apparatus may not be established in a case where it is determined that the first external apparatus is not the target apparatus. The communication apparatus may store setting information in a setting area in a memory in a case where the setting information is received from the first external apparatus by using the first wireless connection.

18 Claims, 9 Drawing Sheets

(51) Int. Cl.
*H04M 1/725* (2006.01)
*H04W 8/22* (2009.01)
*H04W 8/00* (2009.01)
*H04W 48/14* (2009.01)

(52) U.S. Cl.
CPC ............ *H04W 8/22* (2013.01); *H04M 1/7253* (2013.01); *H04W 48/14* (2013.01)

(56) References Cited

U.S. PATENT DOCUMENTS

| | | | |
|---|---|---|---|
| 9,210,732 B2 | 12/2015 | Suzuki | |
| 2002/0197956 A1 | 12/2002 | Annola et al. | |
| 2006/0128360 A1 | 6/2006 | Hibino | |
| 2008/0024591 A1* | 1/2008 | Doi | H04W 8/245 348/14.01 |
| 2009/0046686 A1 | 2/2009 | Izaki | |
| 2010/0115262 A1* | 5/2010 | Suyama | H04L 63/06 713/150 |
| 2010/0285749 A1 | 11/2010 | Annola et al. | |
| 2013/0036231 A1* | 2/2013 | Suumaki | H04W 12/04 709/228 |
| 2013/0044635 A1* | 2/2013 | Suzuki | H04W 76/14 370/254 |
| 2013/0260683 A1 | 10/2013 | Suzuki et al. | |
| 2013/0309971 A1* | 11/2013 | Kiukkonen | H04L 63/107 455/41.2 |
| 2014/0355047 A1* | 12/2014 | Lee | G06F 3/1292 358/1.15 |
| 2015/0249946 A1* | 9/2015 | Oh | H04W 36/14 370/331 |
| 2015/0346914 A1* | 12/2015 | Ebi | G01C 21/06 715/781 |
| 2016/0037564 A1* | 2/2016 | Borden | H04W 76/10 370/254 |
| 2016/0066256 A1 | 3/2016 | Sakai | |

FOREIGN PATENT DOCUMENTS

| | | |
|---|---|---|
| JP | 2009-044701 A | 2/2009 |
| JP | 2013-042400 A | 2/2013 |
| JP | 2014-216766 A | 11/2014 |
| WO | 2014-174769 A1 | 10/2014 |

\* cited by examiner

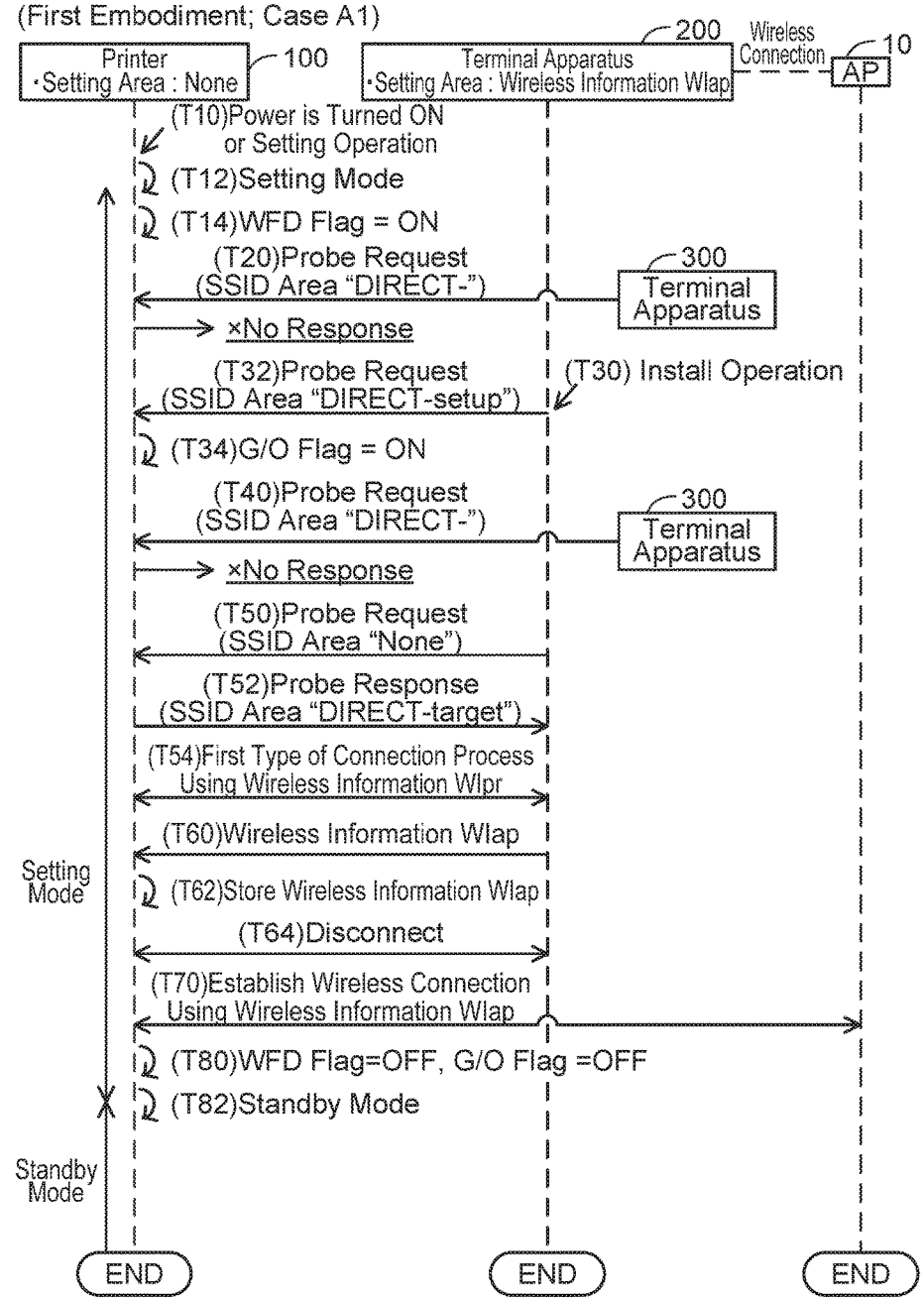

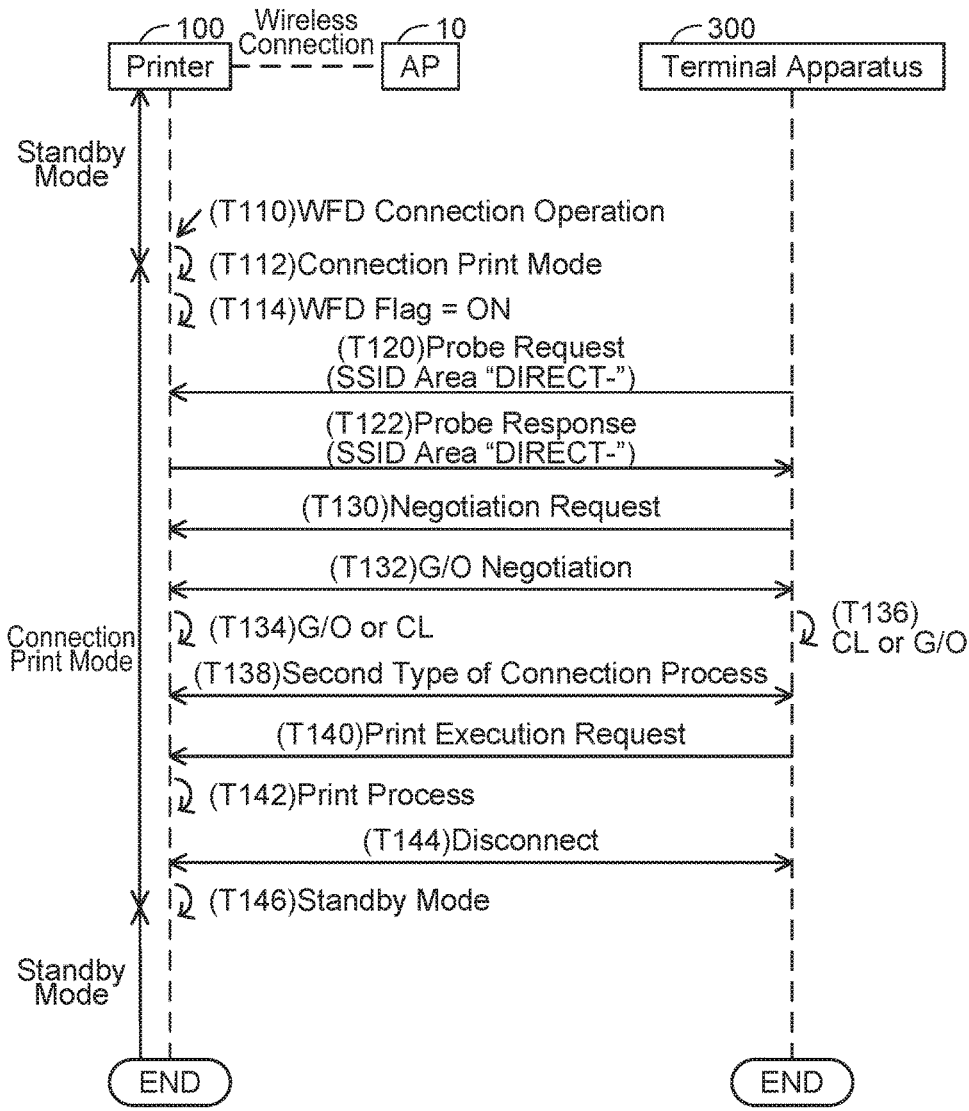

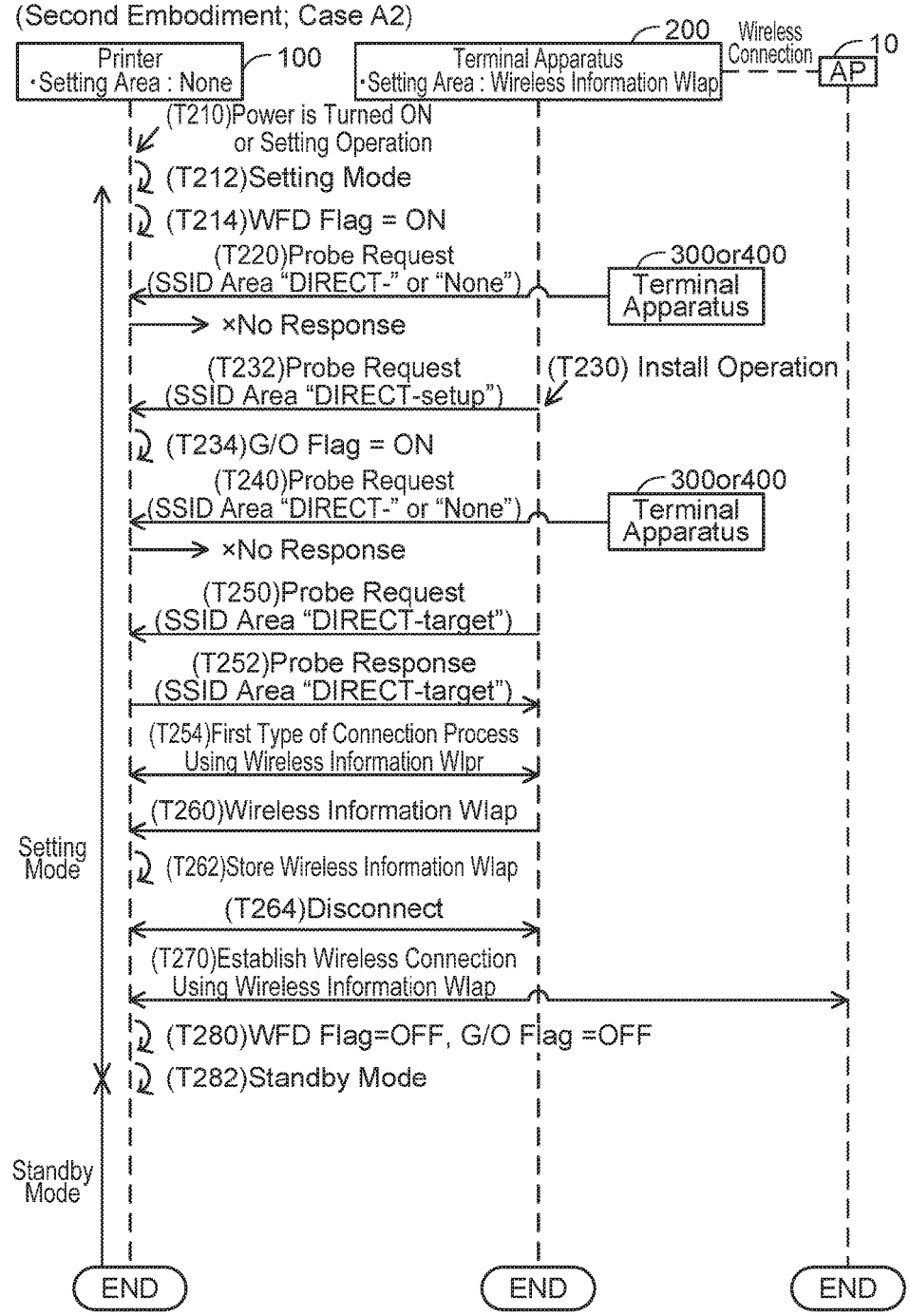

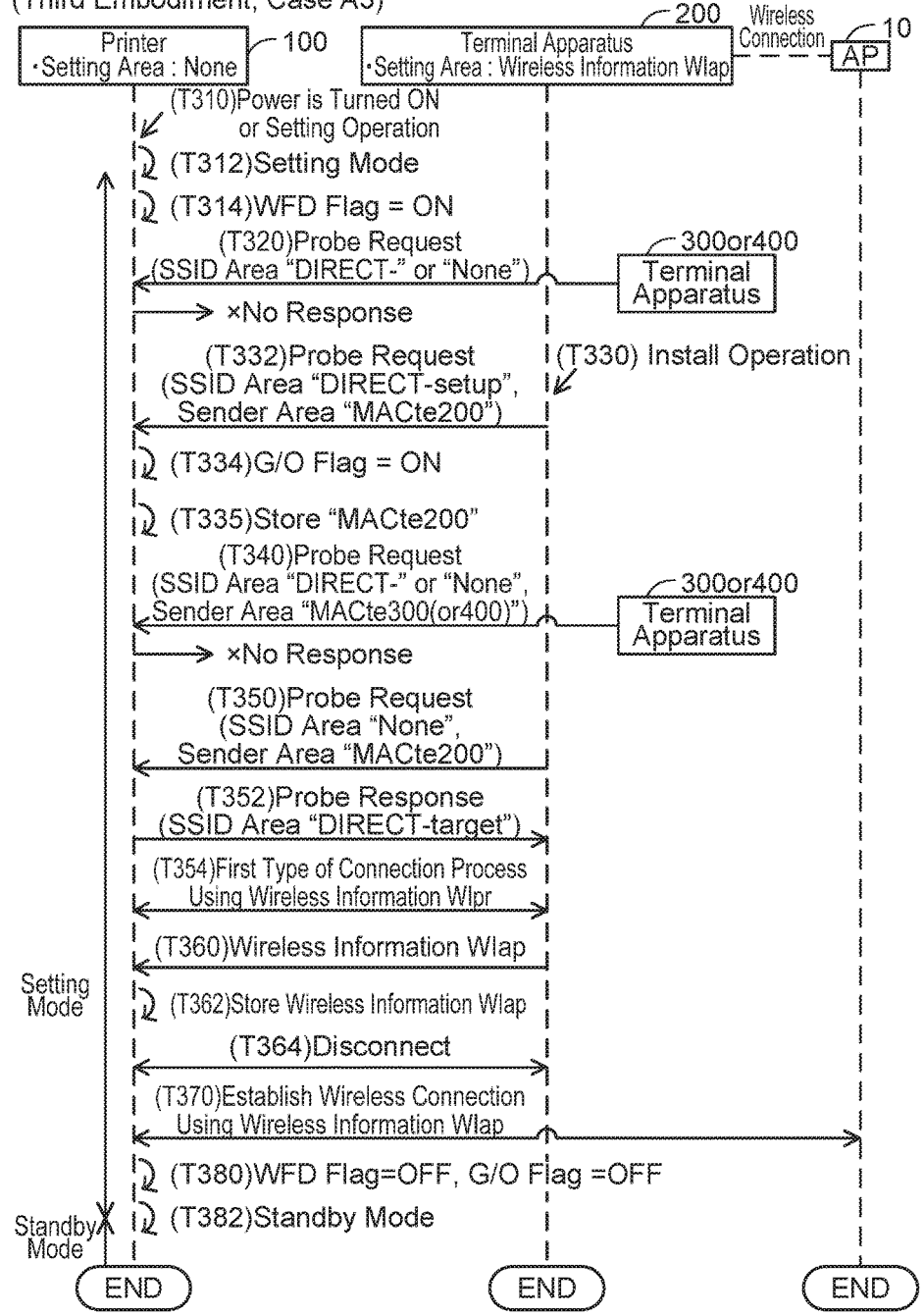

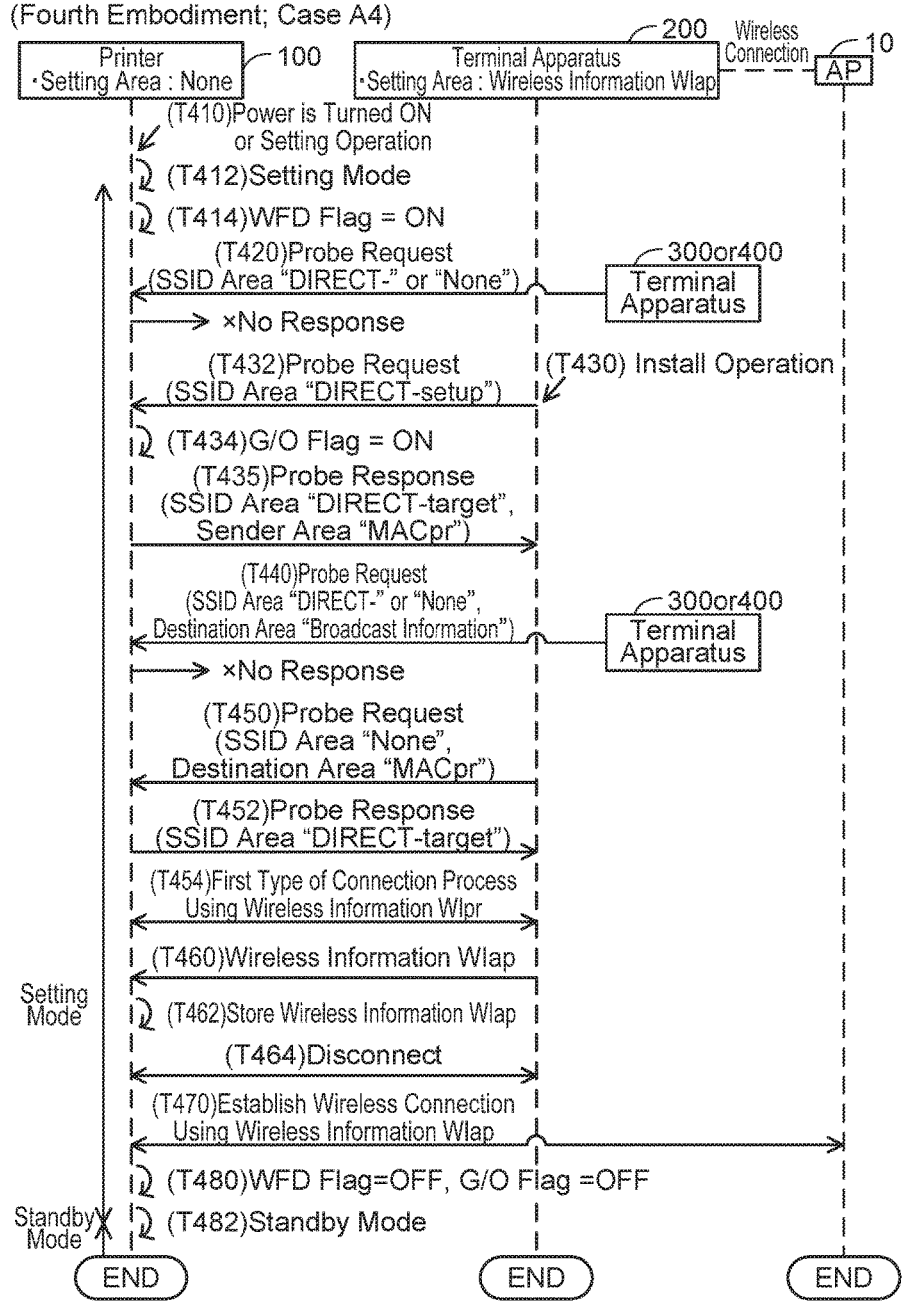

COMMUNICATION APPARATUS

CROSS-REFERENCE TO RELATED APPLICATION

This application claims priority to Japanese Patent Application No. 2015-192158, filed on Sep. 29, 2015, the entire contents of which are hereby incorporated by reference into the present application.

TECHNICAL FIELD

The present disclosure relates to a communication apparatus which receives setting information from an external and stores the setting information in a memory.

BACKGROUND ART

A technique relating to a wireless connection of a first printer and a second printer is known. The first printer has established a wireless connection with an access point, and is storing a network wireless setting for establishing a wireless connection with the access point. The first printer establishes a wireless connection with the second printer by using an ad hoc wireless setting, and sends the network wireless setting to the second printer. Thereby, the second printer can establish a wireless connection with the access point by using the network wireless setting.

SUMMARY

In the technique described above, there is a possibility that for example, if the second printer establishes a wireless connection with an apparatus different from the first printer in a situation where the network wireless setting is to be received from the first printer, the second printer cannot receive the network wireless setting from the first printer. The present disclosure relates to a technique which, in a situation where setting information is to be received from a target apparatus which is to send the setting information to a communication apparatus, allows the communication apparatus to properly receive the setting information from the target apparatus.

A communication apparatus may comprise a wireless interface; a processor; and a memory comprising a setting area for storing setting information which is to be used by the communication apparatus, wherein the memory may store computer-readable instructions therein, and the computer-readable instructions, when executed by the processor, may cause the communication apparatus to execute: operating in one of a plurality of operation modes including a first operation mode for receiving the setting information from a target apparatus so as to store the setting information in the setting area, the target apparatus being to send the setting information to the communication apparatus; determining whether a first external apparatus is the target apparatus by referring a content of a predetermined area included in a first connection request in a case where the first connection request is received from the first external apparatus via the wireless interface under a state where the communication apparatus operates in the first operation mode; establishing a first wireless connection with the first external apparatus via the wireless interface in a case where it is determined that the first external apparatus is the target apparatus, wherein a wireless connection with the first external apparatus via the wireless interface is not established in a case where it is determined that the first external apparatus is not the target apparatus; and storing the setting information in the setting area in a case where the setting information is received from the first external apparatus by using the first wireless connection.

A control method and computer-readable instructions for implementation of the communication apparatus described above, and a non-transitory computer-readable recording medium in which the computer-readable instructions are stored, are also novel and useful. Moreover, a communication system comprising the communication apparatus described above and specific external apparatus is also novel and useful.

BRIEF DESCRIPTION OF THE DRAWINGS

FIG. 2 shows a flowchart of a process at a time when power is turned ON;
FIG. 5 shows a sequence diagram of a case A1 in which a printer operates in a setting mode;
FIG. 6 shows a sequence diagram of a case B in which the printer operates in the connection print mode;
FIG. 7 shows a sequence diagram of a second embodiment;
FIG. 8 shows a sequence diagram of a third embodiment;
and
FIG. 9 shows a sequence diagram of a fourth embodiment.

Figure 1:
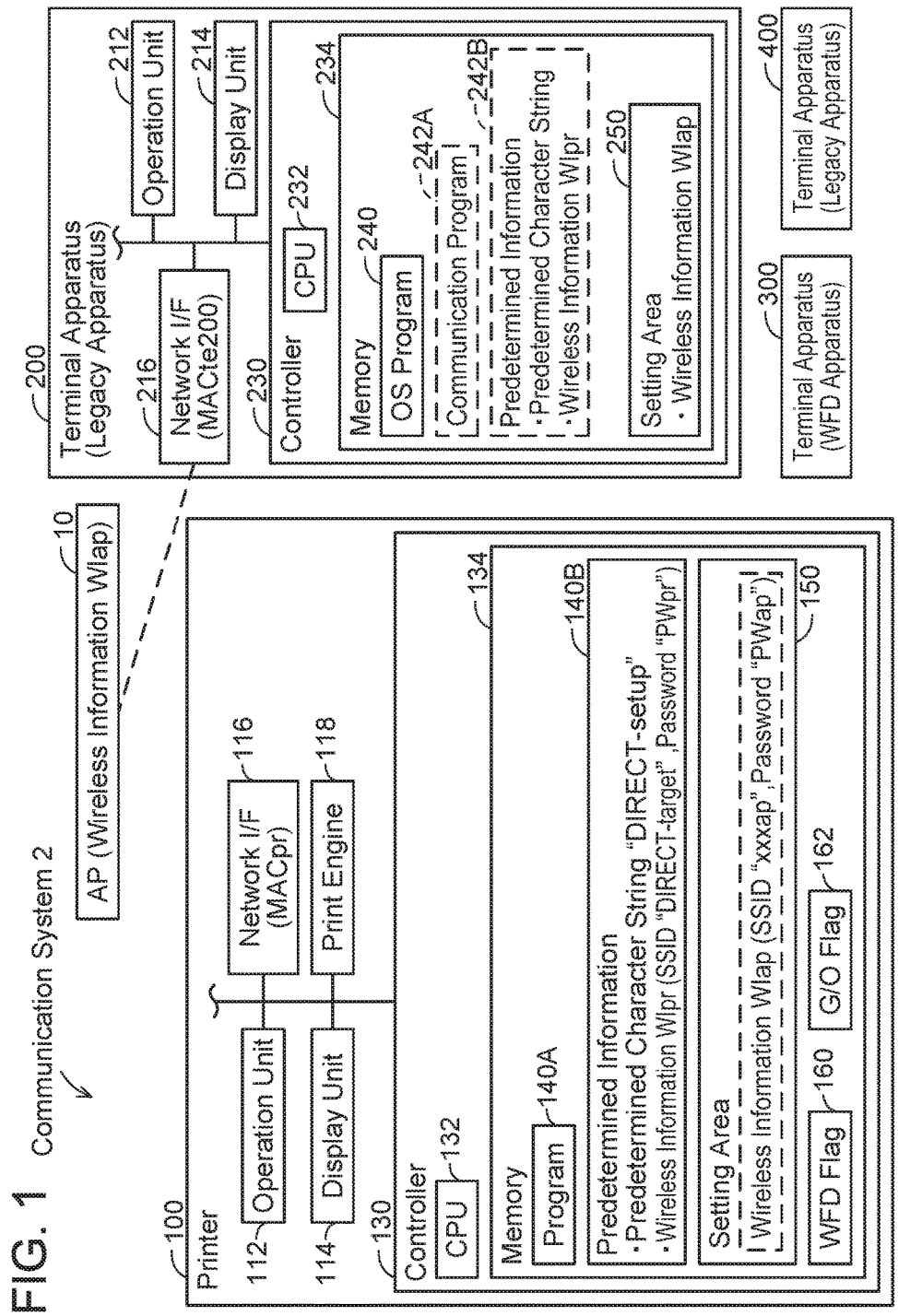
FIG. 1 shows a configuration of a communication system.

EMBODIMENTS (First Embodiment)
(Configuration of Communication System 2)
As shown in FIG. 1, a communication system 2 comprises a printer 100 and a terminal apparatus 200. The printer 100 is capable of establishing a wireless connection with the terminal apparatus 200 and forming a wireless network to which the printer 100 and the terminal apparatus 200 belong. The terminal apparatus 200 has established a wireless connection with an AP (abbreviation of Access Point) 10, and is participating in the wireless network formed by the AP 10. Moreover, below, network may be described as "NW".

(Configuration of Printer 100)
The printer 100 comprises an operation unit 112, a display unit 114, a network interface (called "network I/F" below) 116, a print engine 118, and a controller 130. The operation unit 112 comprises a plurality of keys, and accepts operations of a user. The display unit 114 is a display for displaying various information, and also functions as a so-called touch panel. That is, the display unit 114 also functions as an operation unit. Below, the reference numbers 112, 114 will be omitted at locations where the operation units of the printer 100 are described, and the operation units of the printer 100 will be referred to simply as "operation units". The print engine 118 comprises printing mechanism such as an ink jet scheme, laser scheme, etc.

The network I/F 116 is an I/F for executing a wireless communication in accordance with Wi-Fi scheme, and is assigned a MACpr, which is a MAC address for identifying the I/F. The Wi-Fi scheme is a wireless communication scheme conforming to the standards developed by the Wi-Fi Alliance, and is a wireless communication scheme based on for example, IEEE (abbreviation of The Institute of Electrical and Electronics Engineers, Inc.) standard 802.11 and standards conforming thereto (for example, 802.11a, 11b, 11g, 11n, etc.). In particular, the network I/F 116 supports the Wi-Fi Direct scheme (called "WFD scheme" below). Details of the WFD scheme are described in "Wi-Fi Peer-to-Peer (P2P) Technical Specification Version1.1" created by the Wi-Fi Alliance. Further, details of the WFD scheme are also disclosed in US Patent Application Publication No. 2013/0260683, which is incorporated by reference into the present application.

The controller 130 comprises a CPU 132 and a memory 134. The memory 134 is configured by a ROM, RAM, etc., and has stored a program 140A and predetermined information 140B in advance before the printer 100 was shipped. The CPU 132 executes various processes in accordance with the program 140A. The predetermined information 140B is information referred to by the CPU 132 during execution of the program 140A, and includes a predetermined character string "DIRECT-setup", and wireless information WIpr. The predetermined character string "DIRECT-setup" is a character string used for determining whether the printer 100 is to operate as a Group Owner (called "G/O" below) of the WFD scheme under a state where the printer 100 is operating in an after-mentioned setting mode.

The wireless information WIpr is information used for establishing a wireless connection with the terminal apparatus 200 and forming a wireless NW under a state where the printer 100 is operating in the setting mode, and includes an SSID (abbreviation of Service Set Identifier) "DIRECT-target", and a password "PWpr". The SSID is an identifier for identifying the wireless NW. In particular, the SSID including a character string "DIRECT-" is an identifier for identifying a wireless NW formed by the G/O, i.e., a wireless NW in accordance with the WFD scheme. The password is a character string used for authentication and encryption in the wireless NW.

The memory 134 further comprises a setting area 150. Wireless information may be stored in the setting area 150. However, at the shipment stage of the printer 100, the wireless information is not being stored in the setting area 150, and this is represented by a dashed line in the setting area 150 of FIG. 1. The setting area 150 is an area for storing wireless information WIap for establishing a wireless connection with the AP 10. Specifically, in a case where the wireless information WIap is received from the terminal apparatus 200, the wireless information WIap is stored in the setting area 150. The wireless information WIap is information used in the wireless NW formed by the AP 10, and includes an SSID "xxxap" and a password "PWap".

The memory 134 further comprises a WFD flag 160 and a G/O flag 162. The WFD flag 160 is set to either one of two values: "ON" meaning that the printer 100 is operating in accordance with the WFD scheme, and "OFF" meaning that the printer 100 is not operating. The G/O flag 162 is set to either one of two values: "ON" meaning that the printer 100 is operating autonomously as G/O without executing a G/O Negotiation in accordance with the WFD scheme, and "OFF" meaning that the printer 100 is not operating.

(Configuration of Terminal Apparatus 200)

The terminal apparatus 200 may be a stationary apparatus such as a desktop PC or the like, or may be a portable apparatus such as a notebook PC, etc. The terminal apparatus 200 comprises an operation unit 212, a display unit 214, a network I/F 216, and a controller 230. The operation unit 212 comprises a keyboard and a mouse, and accepts operations of the user. The display unit 214 is a display for displaying various information. The network I/F 216 is an I/F for executing wireless communication in accordance with the Wi-Fi scheme, and is assigned a MACte 200, which is a MAC address for identifying the I/F. The network I/F 216 does not support the WFD scheme. That is, the terminal apparatus 200 is a so-called legacy apparatus incapable of executing a wireless communication in accordance with the WFD scheme.

The controller 230 comprises a CPU 232 and a memory 234. The CPU 232 executes various processes in accordance with an OS (abbreviation of Operating System) program 240 being stored in the memory 234. The memory 234 is configured by a ROM, RAM, etc.

The memory 234 can further store a communication program 242A and predetermined information 242B. These data 242A, 242B, are installed on the terminal apparatus 200 from a server (not shown) on the Internet that is provided by a vendor of the printer 100. In a modification, the data 242A, 242B may be installed on the terminal apparatus 200 from a media shipped together with the printer 100.

The communication program 242A is a program for sending the wireless information WIap of the AP 10 to the printer 100. The predetermined information 242B is information referred to by the CPU 232 during execution of the communication program 242A, and includes the same information as the predetermined information 140B being stored in the printer 100 (i.e., the predetermined character string, the wireless information WIpr).

The memory 234 further comprises a setting area 250 similar to the setting area 150 in the printer 100. In the state of FIG. 1, since the terminal apparatus 200 has established a wireless connection with the AP 10, the wireless information WIap of the AP 10 is being stored in the setting area 250.

In the present embodiment, further, terminal apparatuses 300, 400 which are different from the terminal apparatus 200, are present in surroundings of the printer 100. The terminal apparatus 300 is a WFD apparatus capable of executing wireless communication in accordance with the WFD scheme, such as a smartphone or the like. Further, like the terminal apparatus 200, the terminal apparatus 400 is a legacy apparatus.

(Configuration of AP 10)

The AP 10 is a known AP called a wireless AP, wireless LAN router, or the like. The AP 10 forms a wireless NW by using, for example, the wireless information WIap determined by the user. The AP 10 establishes a wireless connection with the terminal apparatus 200 in accordance with, for example, a so-called automatic wireless setting of WPS (Wi-Fi Protected Setup) or the like, or a manual wireless setting. As a result, the wireless information WIap of the AP 10 is stored in the setting area 250 of the terminal apparatus 200.

In the present embodiment, a situation is assumed in which, for example, in an environment in which a PC is participating in a wireless NW formed by the AP 10 (for example, a home wireless LAN environment), the printer 100, which is newly installed, is caused to participate in the wireless NW. In this type of situation, for example, the communication program 242A is not installed on a WFD apparatus (i.e., the terminal apparatus 300) such as a smartphone, but on a legacy apparatus (i.e., the terminal apparatus 200) such as a PC. Therefore, instead of establishing a wireless connection with the WFD apparatus, the printer 100 needs to establish a wireless connection with the terminal apparatus 200 which is a legacy apparatus, and receive the wireless information WIap from the terminal apparatus 200. In order to realize this, the printer 100 executes the following process.

Figure 2:
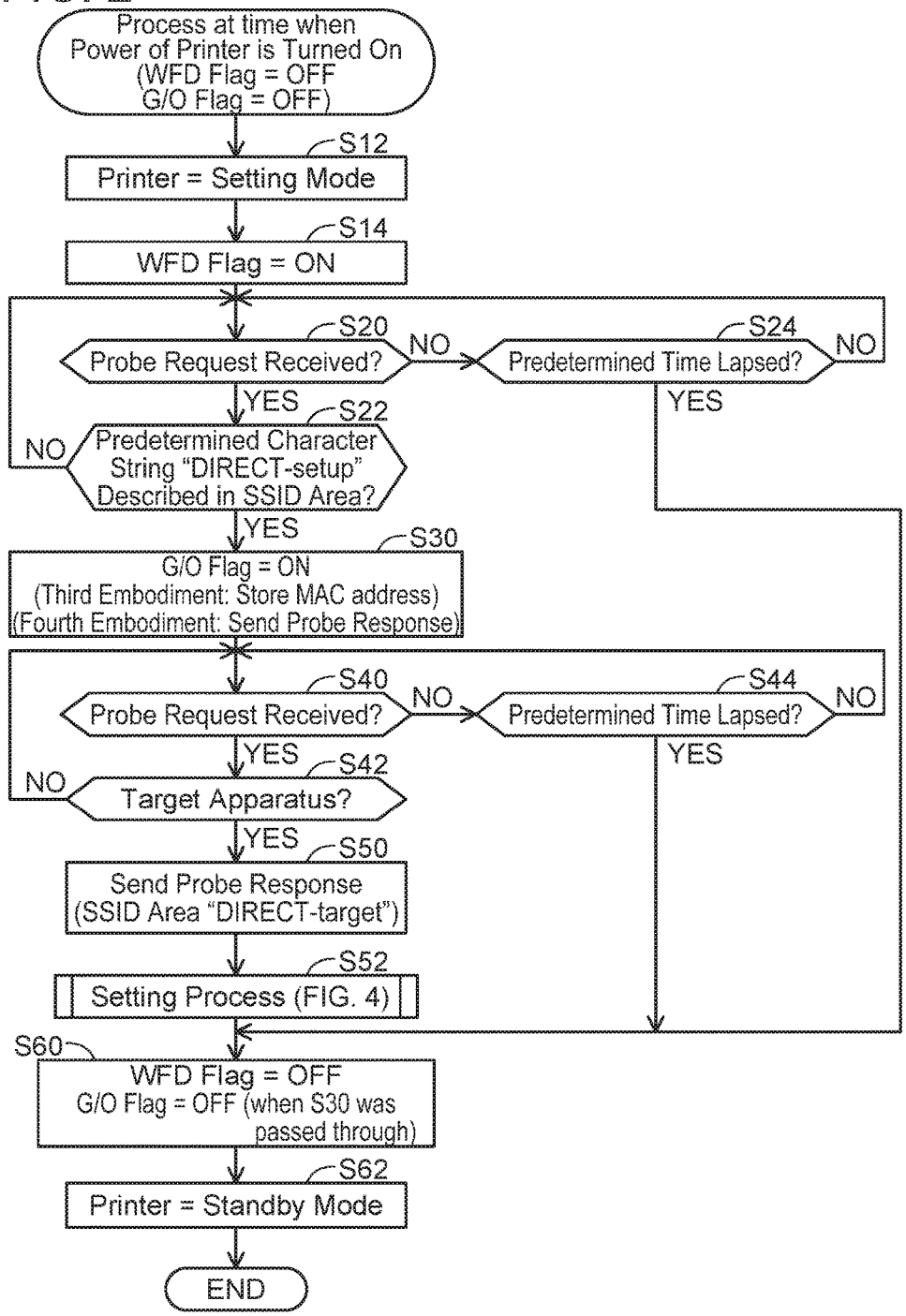

(Process at Time When Power of Printer 100 is Turned ON; FIG. 2)

Next, the contents of a process executed at a time when power of the printer 100 is initially turned ON will be described with reference to FIG. 2. The time when power is initially turned ON includes the power being turned on for the first time after the shipment of the printer 100, and the power being turned on for the first time after an initialization of the printer 100. At a stage where the process of FIG. 2 is started, the flags 160, 162 in the printer 100 are set in OFF. Notably, the following communications and connections executed by the printer 100 and the terminal apparatus 200 are communications and connections via the network I/Fs 116, 216. Therefore, below, the description "via the network I/F 116 (or 216)" will be omitted.

In S12, the CPU 132 causes the printer 100 to operate in the setting mode. The setting mode is an operation mode for receiving the wireless information WIap of the AP 10 from the terminal apparatus 200, and storing the wireless information WIap in the setting area 150. In S14, the CPU 132 changes the WFD flag 160 to ON. Thereby, the printer 100 reaches a state of being able to execute the communications (for example, S20, S40 of FIG. 2, etc.) via the network I/F 116.

Next, in S20, the CPU 132 monitors whether a probe request is received from an external. The probe request is a signal for searching for a connection target of a wireless connection, and includes an SSID area for describing an SSID of the wireless NW formed by the connection target. That is, a probe request in which an SSID (i.e., character string) is described in the SSID area is a signal for searching for an apparatus forming the wireless NW identified by that SSID, i.e., an apparatus operating as a parent station of the wireless NW. On the other hand, a probe request in which nothing is described in the SSID area is a signal for searching for any apparatus capable of receiving the request. Both when receiving a probe request in which a character string is described in the SSID area, and when receiving a probe request in which a character string is not described in the SSID area, the CPU 132 determines YES in S20, and proceeds to S22. Moreover, in the present embodiment, the CPU 132 does not send a probe response to the probe request received in S20 but, in a modification, may send the response.

In S22, the CPU 132 determines whether the predetermined character string "DIRECT-setup" in the predetermined information 140B is described in the SSID area in the probe request received in S20. In a case where nothing is described in the SSID area, or in a case where a character string different from the predetermined character string is described in the SSID area, the CPU 132 determines NO in S22, and returns to S20. On the other hand, in a case where the predetermined character string is described in the SSID area, the CPU 132 determines YES in S22, and proceeds to S30. Moreover, at the stage of S20 and S22 the printer 100 is not operating as a parent station of the wireless NW. Therefore, the probe request for which YES is determined in S22 is not a signal for searching for the printer 100 operating as the parent station of the wireless NW, but is a signal having a role of trigger for causing the printer 100 to operate as the G/O (i.e., parent station).

Further, simultaneously with the monitoring of S20, in S24 the CPU 132 monitors whether a predetermined period of time has lapsed since the power of the printer 100 was initially turned ON. When the predetermined period of time has lapsed without receiving the probe request in which the predetermined character string is described in the SSID area (NO in S20 or NO in S22), the CPU 132 determines YES in S24, skips S30 to S52, and proceeds to S60.

In S30, the CPU 132 changes the G/O flag 162 to ON, causing the printer 100 to operate as G/O. As a result, a wireless NW in which the wireless information WIpr in the predetermined information 140B is used, i.e., a wireless NW identified by the SSID "DIRECT-target" in the wireless information WIpr, is formed. At this stage, only the printer 100 belongs to the wireless NW. When S30 ends, the process proceeds to S40.

In S40, the CPU 132 monitors whether a probe request is received from an external. Both when receiving a probe request in which a character string is described in the SSID area, or when receiving a probe request in which a character string is not described in the SSID area, the CPU 132 determines YES in S40, and proceeds to S42.

In S42, the CPU 132 determines whether the apparatus that is a sender of the probe request received in S40 is a target apparatus. The target apparatus is an apparatus (in the present embodiment, the terminal apparatus 200) which is to send the wireless information WIap to the printer 100 in accordance with the communication program 242A. In order to search for a connection target with which a wireless connection in accordance with the WFD scheme is to be established, a WFD apparatus which supports the WFD scheme sends a probe request in which the character string "DIRECT-" is described in the SSID area. The character string "DIRECT-" is a character string in which nothing is described after the hyphen, and is a character string indicating that operation in accordance with the WFD scheme is being executed. On the other hand, in order to search for a connection target with which a wireless connection in accordance with the normal WFD scheme is to be established, a legacy apparatus which does not support the WFD scheme sends a probe request in which nothing is described in the SSID area. As described above, in the present embodiment, the target apparatus with which the printer 100 is to establish a wireless connection is not the WFD apparatus, but the legacy apparatus (i.e., the terminal apparatus 200). Therefore, in a case where nothing is described in the SSID area in the probe request received in S40, i.e., in a case where the probe request is received from a legacy apparatus, the CPU 132 determines YES in S42, and proceeds to S50. On the other hand, in a case where the character string "DIRECT-" is described in the SSID area, i.e., in a case where the probe request is received from a WFD apparatus, the CPU 132 determines NO in S42, and returns to S40. Moreover, even if a character string different from the character string "DIRECT-" is being described in the SSID area, the CPU 132 determines NO in S42, and returns to S40. However, in a modification, in a case where for example, a predetermined character string is described in the SSID area (for example, the character string "DIRECT-target" in the predetermined information 140B), the CPU 132 may determine YES in S42.

Further, simultaneously with the monitoring of S40, in S44 the CPU 132 monitors whether a predetermined period of time has lapsed since the process of S30 ended. When the predetermined period of time has lapsed without receiving a probe request in which nothing is described in the SSID area (NO in S40, or NO in S42), the CPU 132 determines YES in S44, skips S42 to S52, and proceeds to S60.

In S50, the CPU 132 sends to the terminal apparatus 200, which is the target apparatus, a probe response including the SSID "DIRECT-target" for identifying the wireless NW formed in S30. Then, in S52, the CPU 132 executes a setting process (see FIG. 4, to be described). The setting process includes establishing a wireless connection with the terminal apparatus 200 by using the wireless information WIpr, and includes causing the terminal apparatus 200 to participate as a child station in the wireless NW formed in S30. The setting process further includes receiving the wireless information WIap of the AP 10 from the terminal apparatus 200, and storing the wireless information WIap in the setting area 150. When S52 ends, the process proceeds to S60.

In S60, the CPU 132 changes the WFD flag 160 to OFF. Thereby, the printer 100 reaches a state of being unable to execute communications via the network I/F 116, for example, even if receiving a probe request, the CPU 132 does not send a probe response. Further, in a case where S30 was executed, the CPU 132 changes the G/O flag 162 to OFF. Thereby, the wireless NW formed in S30 disappears.

Figure 3:
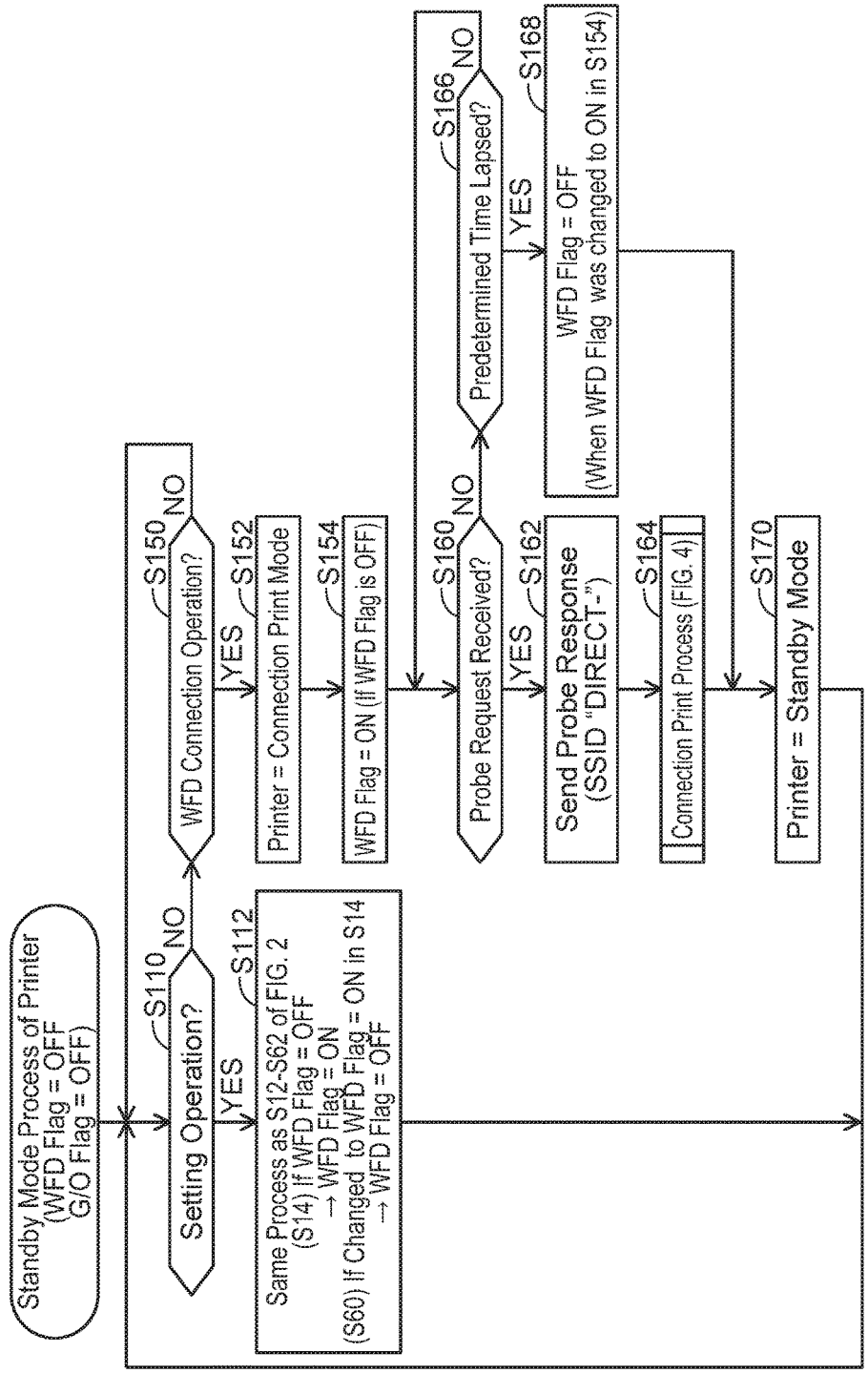
FIG. 3 shows a flowchart of a standby mode process.

In S62, the CPU 132 causes the printer 100 to operate in a standby mode. The standby mode is a mode of waiting until accepting an instruction from the user. When S62 ends, a standby mode process of FIG. 3, described next, is executed. Further, when the power is turned ON second and subsequent times after the initial time of turning the power ON, the standby mode process of FIG. 3 is executed without executing the process of FIG. 2. Moreover, in a modification, the process of FIG. 2 may be executed not only when power is initially turned ON, but also when the power is turned ON second and subsequent times.

(Standby Mode Process of Printer 100; FIG. 3)

Next, the contents of the standby mode process will be described with reference to FIG. 3. At the stage where the process of FIG. 3 is started, the WFD flag 160 and the G/O flag 162 are set in OFF (see S60 of FIG. 2).

In S110, the CPU 132 monitors whether the operation unit accepts a setting operation for causing the printer 100 to operate in the setting mode. In a case where the operation is accepted, i.e., in a case where an instruction for causing the printer 100 to operate in the setting mode is given by the user, the CPU 132 determines YES in S110, and proceeds to S112.

In S112, the CPU 132 executes the same processes as S12 to S62 of FIG. 2. However, if S162 and S164 are executed after the WFD flag 160 was changed to ON in S154 (to be described later), the WFD flag 160 is maintained in ON as long as an operation for changing the WFD flag 160 to OFF is not executed by the user thereafter. Consequently, there is a possibility that the WFD flag 160 is ON at the time S112 is started. In this case, in S14 of FIG. 2, which is included in S112, the WFD flag 160 is already ON, and consequently the CPU 132 does not change the WFD flag 160. Further, in a case where the WFD flag 160 is not changed in S14 of FIG. 2 included in S112, the CPU 132 does not change the WFD flag 160 in S60 of FIG. 2 included in S112. When S112 ends, the process returns to S110.

As described above, in the present embodiment, both in the case when power is initially turned ON and at the time of the setting operation, a wireless NW in which the same wireless information WIpr is used is formed (S30 of FIG. 2, S30 of FIG. 2 included in S112 of FIG. 3). However, in a modification, first wireless information used in a wireless NW formed when power is initially turned ON, may be different from second wireless information used in a wireless NW formed at the time of the setting operation. In this case, the predetermined information 140B and the predetermined information 242B include the first and second wireless information, respectively.

Further, simultaneously with the monitoring of S110, in S150 the CPU 132 monitors whether the operation unit accepts a WFD connection operation for causing the printer 100 to operate in a connection print mode. In a case where the operation has been accepted, i.e., in a case where an instruction for causing the printer 100 to operate in the connection print mode is given by the user, the CPU 132 determines YES in S150, and proceeds to S152.

In S152, the CPU 132 causes the printer 100 to operate in the connection print mode. The connection print mode is an operation mode for establishing a wireless connection with the terminal apparatus 300, which is a WFD apparatus, and executing a print process in response to a print execution request from the terminal apparatus 300. In a case where the WFD flag 160 is OFF, in S154 the CPU 132 changes the WFD flag 160 to ON.

In S160, the CPU 132 monitors whether a probe request in which the character string "DIRECT-" is described in the SSID area is received from the terminal apparatus 300. In a case of receiving the probe request (YES in S160), in S162 the CPU 132 sends a probe response in which the character string "DIRECT-" is described in the SSID area, to the terminal apparatus 300. That is, in S40 and S42 of FIG. 2, the CPU 132 does not send a probe response even if receiving the probe request in which the character string "DIRECT-" is described in the SSID area, but sends a probe response in a case of receiving a probe request in S160 and S162.

In S164, the CPU 132 executes a connection print process (see FIG. 5, to be described). The connection print process includes establishing a wireless connection with the terminal apparatus 300, and executing a print process in response to a print execution request from the terminal apparatus 300. Next, in S170 the CPU 132 causes the printer 100 to operate in the standby mode, and returns to S110.

Further, simultaneously with the monitoring of S160, in S166 the CPU 132 monitors whether a predetermined period of time has lapsed since the printer 100 started operating in the connection print mode (see S152). When the predetermined period of time has lapsed without receiving the probe request in which the character string "DIRECT-" is described in the SSID area (NO in S160), the CPU 132 determines YES in S166, and proceeds to S168. In S168, the CPU 132 changes the WFD flag 160 to OFF in a case where the WFD flag 160 was changed to ON in S154, but maintains the WFD flag 160 in ON without changing in a case where the WFD flag 160 was not changed in S154. That is, the CPU 132 returns the WFD flag 160 to the state at the time of executing the operation of S150. When S168 ends, the process returns to S110 via S170.

Figure 4:
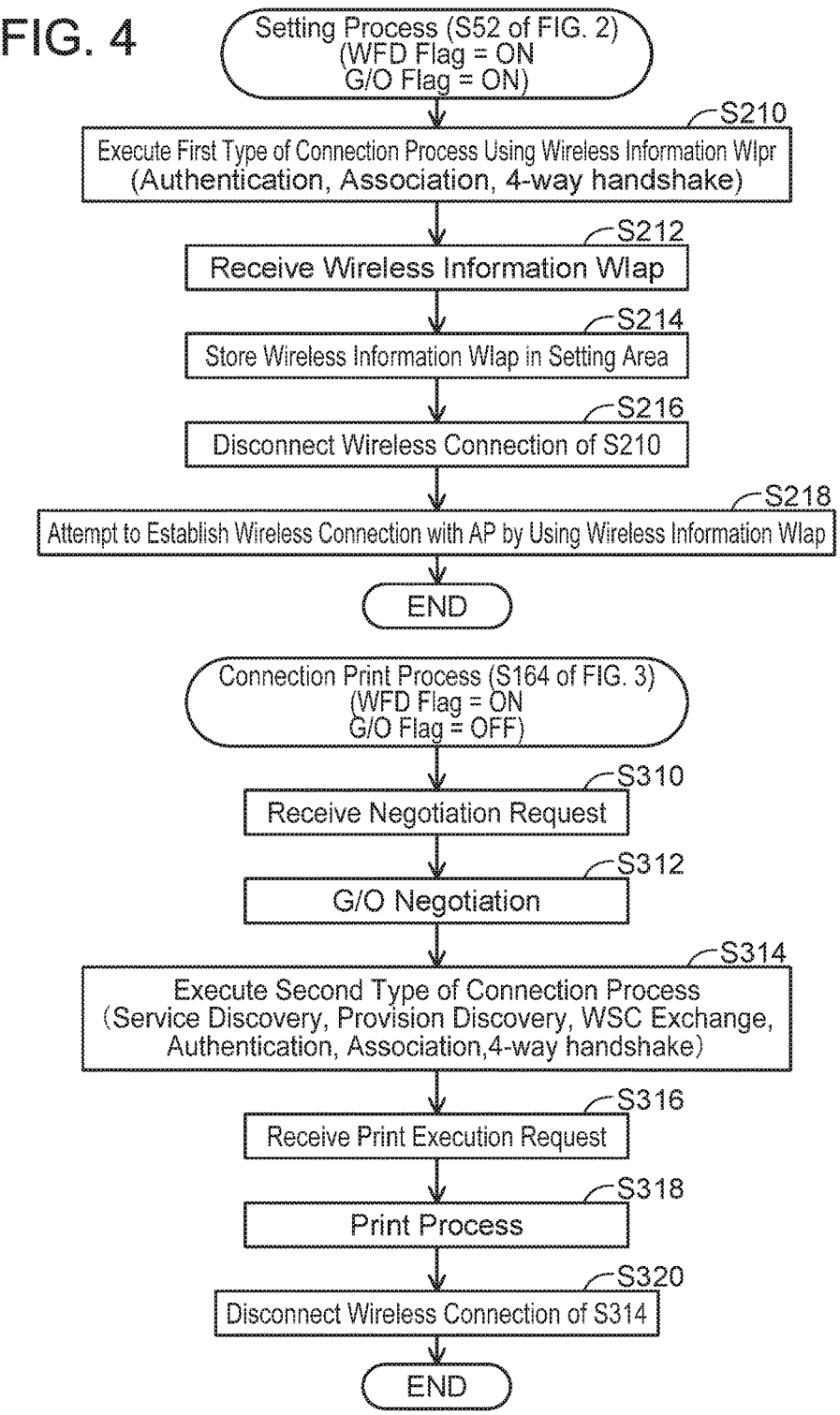
FIG. 4 shows a flowchart of a setting process and a connection print process.

(Setting Process; FIG. 4)

Next, the contents of the setting process executed in S52 of FIG. 2 will be described with reference to FIG. 4. At the stage where the process of FIG. 4 is started, the WFD flag 160 and the G/O flag 162 are each set in ON (see S14, S30 of FIG. 2).

In S210, the CPU 132 executes a first type of connection process for establishing a wireless connection with the terminal apparatus 200, which is the target apparatus. Specifically, the CPU 132 executes the first type of connection process using the wireless information WIpr of the wireless NW formed in S30 of FIG. 2. From the view of a G/O apparatus which is to operate as G/O (here, the printer 100), the first type of connection process includes reception of an Authentication request, sending of a response thereto, reception of an Association request, sending of a response thereto, and communication of a 4-way handshake. Both the printer 100 and the terminal apparatus 200 are capable of storing the wireless information WIpr in advance before the communication of S210 is started, and executing the first type of connection process by using the wireless information WIpr. Therefore, the first type of connection process does not include a communication (i.e., WSC Exchange) for sending the wireless information WIpr from the G/O apparatus to a child station apparatus (here, the terminal apparatus 200) which is to operate as a child station. During the course of communication of the signals, the G/O apparatus receives wireless information from the child station apparatus, executes authentication of the wireless information (i.e., authentication of the child station apparatus) and, in a case where the authentication succeeds, establishes a wireless connection with the child station apparatus. Here, the CPU 132 receives the wireless information WIpr from the terminal apparatus 200, and determines that the authentication of the terminal apparatus 200 has succeeded in a case where the received wireless information WIpr is identical with the wireless information WIpr in the predetermined information 140B. In this case, the CPU 132 establishes a wireless connection with the terminal apparatus 200, and causes the terminal apparatus 200 to participate in the wireless NW as a child station (i.e., legacy).

In S212, the CPU 132 receives the wireless information WIap of the AP 10 from the terminal apparatus 200 not via the AP 10 by using the wireless connection of S210 (i.e., by using the wireless NW). Then, in S214, the CPU 132 stores the wireless information WIap in the setting area 150. Next, in S216, the CPU 132 receives a disconnection request from the terminal apparatus 200 and, as a result, disconnects the wireless connection of S210.

In S218, the CPU 132 attempts to establish a wireless connection with the AP 10 by using the wireless information WIap in the setting area 150. Specifically, the CPU 132 first sends a probe request in which the SSID "xxxap" in the wireless information WIap is described in the SSID area. In a case where the AP 10 is present in the surroundings of the printer 100, the CPU 132 receives a probe response from the AP 10, and then, in the same manner as S210, executes the first type of connection process. However, here, the point of the printer 100 operating as a child station is different from S210 in which the printer 100 operates as G/O (i.e., parent station). During the course of the first type of connection process, the CPU 132 sends the wireless information WIap to the AP 10. Then, in a case where authentication using the wireless information WIap in the AP 10 (i.e., authentication of the printer 100) succeeds, the CPU 132 establishes a wireless connection with the AP 10. That is, the CPU 132 causes the printer 100 to participate as a child station in the wireless NW of the AP 10. When S218 ends, the setting process ends.

Although not shown, in a case where the establishment of a wireless connection with the AP 10 succeeds in S218, the CPU 132 can execute a communication with the terminal apparatus 200 or another apparatus by using the wireless NW of the AP 10 (i.e., via the AP 10). For example, the CPU 132 can receive a print execution request from the terminal apparatus 200 via the AP 10. In this case, the CPU 132 causes the print engine 118 to execute a print process in accordance with the print execution request.

(Connection Print Process; FIG. 4)

Next, contents of the connection print process executed in S164 of FIG. 3 will be described with reference to FIG. 4. At the stage where the process of FIG. 4 is started, the WFD flag 160 is set in ON and the G/O flag 162 is set in OFF (see S154 of FIG. 3).

In S310, the CPU 132 receives a Negotiation request from the terminal apparatus 300, which is a WFD apparatus. The request is a signal for requesting execution of G/O Negotiation of the WFD scheme. Next, in S312, the CPU 132 executes a G/O Negotiation with the terminal apparatus 300. Specifically, the CPU 132 sends a signal including a predetermined intent value of the printer 100 (i.e., a value indicating ease of becoming G/O) to the terminal apparatus 300 and, further, receives from the terminal apparatus 300 a signal including an intent value of the terminal apparatus 300. Then, in a case where the intent value of the printer 100 is larger than the intent value of the terminal apparatus 300, the CPU 132 determines that the printer 100 is to operate as the G/O and, in a case where the intent value of the terminal apparatus 300 is larger than the intent value of the printer 100, determines that the terminal apparatus 300 is to operate as the G/O.

In S314, the CPU 132 executes a second type of connection process for establishing a wireless connection with the terminal apparatus 300. From the view of the G/O apparatus, the second type of connection process includes reception of a Service Discovery request, sending of a response thereto, reception of a Provision Discovery request, sending of a response thereto, communication of a WSC Exchange, and a communication of each signal which is communicated in the first type of connection process of S210. That is, the second type of connection process includes a communication of a signal which is not communicated in the first type of connection process (for example, Service Discovery request, etc.) for example. Further, the G/O apparatus generates wireless information by, for example, determining a random character string and, in the WSC Exchange, sends the wireless information to a Client apparatus (called "CL apparatus" below). Thereby, both the G/O apparatus and the CL apparatus can use the same wireless information, and a wireless connection between the G/O apparatus and the CL apparatus is established. Thus, in S314, the CPU 132 establishes a wireless connection in which the printer 100 operates as the G/O in a case of determining in S312 that the printer 100 is to operate as the G/O, and establishes a wireless connection in which the printer 100 operates as the CL in a case of determining in S312 that the printer 100 is to operate as the CL.

In S316, the CPU 132 receives a print execution request from the terminal apparatus 300 not via the AP 10 by using the wireless connection of S314. The print execution request is a command for requesting the printer 100 to execute the print process, and includes print data representing a target image of a print target. In S318, the CPU 132 provides the print data to the print engine 118, and causes the print engine 118 to execute a print of the target image.

In S320, the CPU 132 disconnects the wireless connection of S314. In the case where the printer 100 is the G/O apparatus, the CPU 132 receives a disconnection request from the terminal apparatus 300, and disconnects the wireless connection. Further, in the case where the printer 100 is the CL apparatus, the CPU 132 sends a disconnection request to the terminal apparatus 300, and disconnects the wireless connection. When S320 ends, the connection print process ends.

(Case A1; FIG. 5)

Next, specific cases implemented by the processes of FIG. 2 to FIG. 4 will be described with reference to FIG. 5 and FIG. 6. First, a case A1 in which the printer 100 operates in the setting mode will be described with reference to FIG. 5. In an initial state of FIG. 5, the terminal apparatus 200 has established a wireless connection with the AP 10. Therefore, the wireless information WIap is being stored in the setting area 250.

In T10, in the printer 100, the power is initially turned on (the trigger of the process of FIG. 2), or the setting operation is executed (YES in S110 of FIG. 3). In this case, in T12, the printer 100 operates in the setting mode (S12) and, in T14, changes the WFD flag 160 to ON (S14).

In the present case, after T14, in a case where the user of the terminal apparatus 300, which is not the target apparatus, desires to establish a wireless connection with the printer 100, the user executes a predetermined operation in the terminal apparatus 300. In this case, in T20, the terminal apparatus 300 broadcasts a probe request in which the character string "DIRECT-", indicating it is operating in accordance with the WFD scheme, is described in the SSID area.

Even if receiving the request of T20 (YES in S20), the printer 100 determines that the predetermined character string "DIRECT-setup" is not described in the SSID area in the request (NO in S22), and does not send a probe response to the request. Thereby, the phenomenon of the printer 100 establishing a wireless connection with the terminal apparatus 300 does not occur.

In T30, the terminal apparatus 200 accepts an install operation for installing the communication program 242A and the predetermined information 242B in the terminal apparatus 200. In this case, the terminal apparatus 200 installs and starts the communication program 242A, and executes the processes below in accordance with the communication program 242A. In T32, the terminal apparatus 200 broadcasts a probe request in which the predetermined character string "DIRECT-setup" is described in the predetermined information 242B in the SSID area.

Upon receiving the request of T32 (YES in S20), the printer 100 determines that the predetermined character string "DIRECT-setup" is described in the SSID area in the request (YES in S22) and, in T34 changes the G/O flag 162 to ON (i.e., operates autonomously as the G/O), forming the wireless NW in which the wireless information WIpr is used (S30).

As described above, even if sending the probe request of T20, the terminal apparatus 300 does not receive a probe response from the printer 100. Therefore, in T40, the terminal apparatus 300 re-broadcasts the probe request.

Even if receiving the request of T40 (YES in S40), since the character string "DIRECT-" is described in the SSID area in the request, the printer 100 determines that the terminal apparatus 300, which is the sender of the request, is not the target apparatus (NO in S42), and does not send a probe response to the request. Thereby, the phenomenon of the printer 100 establishing a wireless connection with the terminal apparatus 300 does not occur.

On the other hand, after sending the request of T32, in T50 the terminal apparatus 200 broadcasts a probe request in which nothing is described in the SSID area.

Upon receiving the request of T50 (YES in S40), since nothing is described in the SSID area in the request, the printer 100 determines that the terminal apparatus 200, which is the sender of the request, is the target apparatus (YES in S42) and, in T52, sends to the terminal apparatus 200 a probe response in which the SSID "DIRECT-target" is described in the SSID area (S50). Thereby, the printer 100 executes the process below for establishing a wireless connection with the terminal apparatus 200. That is, in T54, the printer 100 executes the first type of connection process using the wireless information WIpr, and establishes a wireless connection with the terminal apparatus 200 (S210 of FIG. 4). As a result, a state is constructed in which both the printer 100 and the terminal apparatus 200 belong to the wireless NW.

Upon receiving the response of T52, the terminal apparatus 200 determines that the wireless information WIpr including the SSID "DIRECT-target" in the response is being stored in the terminal apparatus 200 (see the predetermined information 242B) and, in T54, executes the first type of connection process using the wireless information WIpr, establishing a wireless connection with the printer 100. Next, in T60, the terminal apparatus 200 sends the wireless information WIap in the setting area 250 to the printer 100 by using the wireless connection of T54.

Upon receiving the wireless information WIap of T60 (S212), in T62 the printer 100 stores the wireless information WIap in the setting area 150 (S214) and, in T64 disconnects the wireless connection of T54 (S216). Then, in T70, the printer 100 executes the first type of connection process using the wireless information WIap in the setting area 150, and establishes a wireless connection with the AP 10 (S218). Thereby, a state is constructed in which both the printer 100 and the terminal apparatus 200 belong to the wireless NW of the AP 10.

Next, in T80 the printer 100 changes the WFD flag 160 and the G/O flag 162 to OFF (S60 of FIG. 2) and, in T82, operates in the standby mode (S62).

As described above, since the printer 100 operates in the setting mode when power is initially turned ON or at the time of the setting operation (T12), once the communication program 242A is installed in the terminal apparatus 200 (i.e., the target apparatus) accompanied by initially turning ON the power or with the setting operation (T30), a wireless connection with the terminal apparatus 200 is established (T54), and the wireless information WIap can be received from the terminal apparatus 200 (T60). Therefore, the printer 100 can participate in the wireless NW of the AP 10 by using the wireless information WIap (T70). It is sufficient for the user to install the communication program 242A in the terminal apparatus 200, and the user does not need to execute another operation for causing the printer 100 to participate in the wireless NW of the AP 10 (for example, an operation of entering the wireless information WIap directly to the printer 100). Therefore, it is possible to improve convenience for the user. Then, although not shown, the printer 100 can execute communication with the apparatuses (for example, the terminal apparatus 200) participating in the wireless NW of the AP 10.

Here, adoption of a configuration of a first comparative example is assumed in which, in a case of receiving the probe request of T20 from the terminal apparatus 300, which is not the target apparatus, the printer 100, which is in a state of not operating as the G/O (i.e., the state before T34), sends to the terminal apparatus 300 the probe response in which the character string "DIRECT-" is described in the SSID area. In this case, the printer 100 executes the same processes as S310 to S314 of FIG. 4, and can establish, with the terminal apparatus 300, a wireless connection in which the printer 100 operates as G/O or CL. Further, adoption of a configuration of a second comparative example is assumed in which, in a case of receiving the probe request of T40 from the terminal apparatus 300, which is not the target apparatus, the printer 100, which is in a state of operating as the G/O (i.e., the state after T34), sends to the terminal apparatus 300 a probe response in which the character string "DIRECT-target" is described in the SSID area. In this case, if for example, the predetermined information 242B has been installed in the terminal apparatus 300, and the terminal apparatus 300 is storing the wireless information WIpr, the printer 100 executes the same process as S210 of FIG. 4, and can establish, with the terminal apparatus 300, a wireless connection in which the printer 100 operates as the G/O. Thus, in the configurations of the first and second comparative examples, the printer 100 can establish a wireless connection with the terminal apparatus 300.

For example, under a state where a wireless connection in which the printer 100 operates as the CL has been established with the terminal apparatus 300, the printer 100 cannot further establish a wireless connection with another apparatus. Further, for example it is assumed that a maximum number of child stations which can participate in the wireless NW in which the printer 100 operates as the G/O is determined as "1". In this case, under a state where a wireless connection in which the printer 100 operates as the G/O has been established with the terminal apparatus 300, the printer 100 cannot further establish a wireless connection with another apparatus. Consequently, in either of the above states, the printer 100 does not establish a wireless connection with the terminal apparatus 200 even if receiving the probe request of T50 from the terminal apparatus 200. Further, for example, even if the maximum number is "2" or more, when establishing a wireless connection with the terminal apparatus 300, the printer 100 can receive a print execution request from the terminal apparatus 300. That is, it is possible that the printer 100 executes a print process in response to the print execution request from the terminal apparatus 300 and, while executing this process, the printer 100 cannot establish a wireless connection with the terminal apparatus 200 even if receiving the probe request of T50 from the terminal apparatus 200.

By contrast, in the present embodiment, even if receiving the probe request of T20 or T40 from the terminal apparatus 300, the printer 100 does not send a probe response to the terminal apparatus 300. Therefore, it is possible to suppress the phenomenon of the printer 100 establishing a wireless connection with the terminal apparatus 300, which is not the target apparatus, while the printer 100 is operating in the setting mode. As a result, the printer 100 can properly establish a wireless connection with the terminal apparatus 200, which is the target apparatus, and consequently the wireless information WIap can be properly received from the terminal apparatus 200.

It should be noted that in a modification, the printer 100 sends a probe response to the probe request of T20 to the terminal apparatus 300 but, by not executing the subsequent processes (for example, the G/O Negotiation, etc.) for establishing a wireless connection with the terminal apparatus 300, the printer 100 may not establish a wireless connection with the terminal apparatus 300. Further, the printer 100 sends a probe response to the request of T40 to the terminal apparatus 300 but, by not executing the subsequent processes (for example, sending a response to the Authentication request, etc.) for establishing a wireless connection with the terminal apparatus 300, the printer 100 may not establish a wireless connection with the terminal apparatus 300. Even with this type of configuration, also, it is possible to suppress the phenomenon of the printer 100 establishing a wireless connection with the terminal apparatus 300 which is not the target apparatus.

Further, adoption of a configuration of a third comparative example is assumed in which, when power is initially turned ON, the printer 100 automatically operates as the G/O even without receiving the probe request in which the predetermined character string "DIRECT-setup" is described in the SSID area. In this case, even in a situation in which the communication program 242A is not installed in the terminal apparatus 200 accompanied by the power of the printer 100 being initially turned ON, i.e., in a situation where it is not necessary to establish a wireless connection with the terminal apparatus 200, the printer 100 automatically operates as the G/O. Since the printer 100 operating as the G/O periodically sends a beacon signal for notifying its presence to surrounding apparatuse(s), there is a higher power consumption than the state of not being the G/O. That is, in the configuration of the third comparative example, there is a possibility of wasteful power consumption in the printer 100 as a result of the printer 100 operating unnecessarily as the G/O. By contrast, since in the present embodiment, the printer 100 does not operate as the G/O in a situation where the printer 100 does not need to establish a wireless connection with the terminal apparatus 200 (NO in S20, or NO in S22, of FIG. 2), power saving of the printer 100 can be realized.

(Case B; FIG. 6)

Next, a case B in which a WFD connection operation is executed in the printer 100 will be described with reference to FIG. 6. In an initial state of case B, the printer 100 is participating in the wireless NW of the AP 10 (T70 of FIG. 5). However, the terminal apparatus 300 is not participating in the wireless NW of the AP 10.

In T110, under a state of operating in the standby mode, the printer 100 accepts the WFD connection operation (YES in S150 of FIG. 3). In this case, in T112 the printer 100 operates in the connection print mode (S152) and, in T114, changes the WFD flag 160 to ON (S154).

In a case where a predetermined operation is accepted, in T120 the terminal apparatus 300 broadcasts a probe request in which the character string "DIRECT-" is described in the SSID area. The predetermined operation includes an operation of designating an image file representing a target image of a print target.

Upon receiving the request of T120 (YES in S160), in T122 the printer 100 sends, to the terminal apparatus 300, a probe response in which the character string "DIRECT-" is described in the SSID area (S162). Then, in T130, the printer 100 receives a Negotiation request from the terminal apparatus 300 (S310 of FIG. 4) and, in T132, executes a G/O Negotiation with the terminal apparatus 300 (S312). As a result, in T134, the printer 100 determines that the printer 100 is to operate as the G/O or the CL and, in T136, the terminal apparatus 300 determines that the terminal apparatus 300 is to operate as the CL or the G/O. Then, in T138, the second type of connection process is executed in which the wireless information determined by the G/O apparatus is used, establishing a wireless connection between the printer 100 and the terminal apparatus 300 (S314).

The terminal apparatus 300 has an exclusive driver program for the printer 100, or a generic driver program for various models of printer. The terminal apparatus 300 converts the image file designated in the predetermined operation in accordance with the driver program, generating print data that can be interpreted by the print engine 118 of the printer 100. Then, in T140, the terminal apparatus 300 sends a print execution request including the print data to the printer 100.

Upon receiving the request of T140 (S316), in T142 the printer 100 executes a print process in accordance with the print data in the request (S318). Next, in T144, the printer 100 disconnects the wireless connection of T138 (S320) and, in T146, operates in the standby mode (S170 of FIG. 3).

As described above, in case B the printer 100 is participating in the wireless NW of the AP 10, but the terminal apparatus 300 is not participating in this wireless NW. Therefore, the printer 100 cannot receive a print execution request from the terminal apparatus 300 via the AP 10 by using the wireless NW. However, since the printer 100 is operating in the connection print mode at the time of the WFD connection operation (T112), the printer 100 can establish a wireless connection with the terminal apparatus 300 (T138), and receive a print execution request from the terminal apparatus 300 (T140). Therefore, the printer 100 can properly execute the print process (T142).

(Correspondence Relationship)

The setting mode and the connection print mode are examples of "first operation mode" and "second operation mode", respectively. The setting operation of S110 of FIG. 3, and the WFD connection operation of S150 are examples of "first instruction" and "second instruction", respectively. The wireless NW of the AP 10, and the wireless NW formed in S30 of FIG. 2 are examples of "first wireless network" and "second wireless network", respectively. The SSID area is an example of "predetermined area". Nothing being described in the SSID area is an example of "specific content". The character string "DIRECT-" is an example of "operating character string".

In FIG. 5, the probe request of T32 is an example of "third connection request". The probe request of T40 and the probe request of T50 are examples of "first connection request". The terminal apparatus 200 and the terminal apparatus 300 are an example of "first external apparatus" determined to be "target apparatus", and "first external apparatus" determined not to be "target apparatus", respectively. The wireless connection of T54, and the wireless connection of T70 are examples of "first wireless connection" and "second wireless connection", respectively. In FIG. 6, the terminal apparatus 300, the probe request of T120, the wireless connection of T138, and the print execution request of T140 are examples of "second external apparatus", "second connection request", "third wireless connection" and "execution request", respectively.

(Second Embodiment)

In the present embodiment, the content of the determining process of S42 of FIG. 2 is different from the first embodiment. As described above, the terminal apparatus 200, which is the target apparatus, is storing the wireless information WIpr (see the predetermined information 242B of FIG. 1). After the printer 100 has formed the wireless NW identified by the SSID "DIRECT-target" (S30 of FIG. 2), the terminal apparatus 200 sends a probe request in which the character string "DIRECT-target" in the wireless information WIpr is described in the SSID area. The CPU 132 determines YES in S42 in a case where the character string "DIRECT-target" is described in the SSID area in the probe request received in S40, and determines NO in S42 in a case where the character string "DIRECT-target" is not described in the SSID area.

(Case A2; FIG. 7)

In the present embodiment, case A2 of FIG. 7 is realized instead of case A1 of FIGS. 5. T210 to T214 are the same as T10 to T14 of FIG. 5.

In T220, as in T20 of FIG. 5, the terminal apparatus 300, which is not the target apparatus, broadcasts a probe request in which the character string "DIRECT-" is described in the SSID area. Further, in the present case, a situation is further assumed in which, in a case where a user of the terminal apparatus 400, which is not the target apparatus, wishes to establish a wireless connection with the printer 100, the user performs a predetermined operation on the terminal apparatus 400. In this case, in T220 the terminal apparatus 400, which is a legacy apparatus, broadcasts a probe request in which nothing is described in the SSID area. In T220, even if receiving a probe request from each of the terminal apparatuses 300, 400 (YES in S20), the printer 100 determines that the predetermined character string "DIRECT-setup" is not described in the SSID area in the request (NO in S22), and does not send a probe response to the request. Thereby, the phenomenon does not occur in which the printer 100 establishes a wireless connection with any of the terminal apparatuses 300, 400.

T230 to T234 are the same as T30 to T34 of FIG. 5. In T240, each of the terminal apparatuses 300, 400 re-broadcasts a probe request. Even if receiving the request of T240 (YES in S40), since the character string "DIRECT-target" is not described in the SSID area in the request, the printer 100 determines that the terminal apparatus that is the sender of the request is not the target apparatus (NO in S42), and does not send a probe response to the request. Thereby, the phenomenon does not occur in which the printer 100 establishes a wireless connection with any of the terminal apparatuses 300, 400.

On the other hand, after having sent the request of T232, in T250, the terminal apparatus 200 broadcasts a probe request in which the character string "DIRECT-target" is described in the SSID area. Upon receiving the request of T250 (YES in S40), since the character string "DIRECT-target" is described in the SSID area in the request, the printer 100 determines that the terminal apparatus 200 which is the sender of the request, is the target apparatus (YES in S42) and, in T252, sends a probe response to the terminal apparatus 200 (S50). T254 to T282 are the same as T54 to T82 of FIG. 5.

In the present embodiment, also, as in the first embodiment, it is possible to suppress the occurrence of the phenomenon in which the printer 100 establishes a wireless connection with the terminal apparatus 300 which is not the target apparatus, while the printer 100 is operating in the setting mode. Further, even in a situation where the terminal apparatuses 200, 400 are present, these being two or more legacy apparatuses, the printer 100 does not send a probe response to the terminal apparatus 400 even if receiving the probe request of T220 or T240 from the terminal apparatus 400 which is not the target apparatus. Therefore, it is possible to suppress the occurrence of the phenomenon in which the printer 100, while operating in the setting mode, establishes a wireless connection with the terminal apparatus 400 which is not the target apparatus. As a result, the printer 100 can properly establish a wireless connection with the terminal apparatus 200 which, of the two or more legacy apparatuses, is the target apparatus, and consequently can properly receive the wireless information WIap from the terminal apparatus 200.

In the present embodiment, also, the SSID area is an example of "a predetermined area". The character string "DIRECT-target" being described in the SSID area is an example of "specific content". Further, the SSID "DIRECT-target" is an example of "predetermined SSID".

(Third Embodiment)

In the present embodiment, the content of the process of S30 of FIG. 2, and the content of the determining process of S42 are different from the first embodiment. As described above, the terminal apparatus 200, which is the target apparatus, sends a probe request in which the predetermined character string "DIRECT-setup" is described in the SSID area. The probe request includes a sender area in which a MAC address of a sender apparatus is to be written, and the MACte 200, this being the MAC address of the terminal apparatus 200, is described in this sender area. In S30, the CPU 132 stores, in the memory 134, the MACte 200 described in the sender area in the probe request received in S20. The CPU 132 determines YES in S42 in a case where the stored MACte 200 is described in the sender area in the probe request received in S40, and determines NO in S42 in a case where the stored MACte 200 is not described in the sender area.

(Case A3; FIG. 8)

In the present embodiment, case A3 of FIG. 8 is realized instead of case A1 of FIGS. 5. T310 to T332 are the same as T210 to T232 of FIG. 7. The MACte 200 is described in the sender area in the probe request of T332.

Upon receiving the request of T332, in T334 the printer 100 changes the G/O flag to ON (S30) and, in T335, stores the MACte 200 described in the sender area in the request (S30). T340 is the same as T240 of FIG. 7. In a case where the sender of the request of T340 is the terminal apparatus 300, a MACte 300, which is the MAC address of the terminal apparatus 300, is described in the sender area in the request. In a case where the sender of the request of T340 is the terminal apparatus 400, a MACte 400, which is the MAC address of the terminal apparatus 400, is described in the sender area in the request. Even if receiving the request of T340 (YES in S40), since the MACte 200 stored in T335 is not described in the sender area in the request, the printer 100 determines that the terminal apparatus which is the sender of the request is not the target apparatus (NO in S42), and does not send a probe response to the request. Thereby, the phenomenon in which the printer 100 establishes a wireless connection with any of the terminal apparatuses 300, 400 does not occur.

On the other hand, after having sent the request of T332, in T350 the terminal apparatus 200 broadcasts a probe request in which nothing is described in the SSID area. The MACte 200, which is the MAC address of the terminal apparatus 200, is described in the sender area of the request. Upon receiving the request of T350 (YES in S40), since the MACte 200 stored in T335 is described in the sender area in the request, the printer 100 determines that the terminal apparatus 200 which is the sender of the request is the target apparatus (YES in S42) and, in T352, sends a probe response to the terminal apparatus 200 (S50). T354 to T382 are the same as T54 to T82 of FIG. 5.

In the present embodiment, also, it is possible to suppress the occurrence of the phenomenon in which the printer 100, while operating in the setting mode, establishes a wireless connection with any of the terminal apparatuses 300, 400 which are not the target apparatuses. Therefore, the printer 100 can properly establish a wireless connection with the terminal apparatus 200 which is the target apparatus, and consequently can properly receive the wireless information WIap from the terminal apparatus 200.

In the present embodiment, the sender area is an example of "predetermined area". The MACte 200 stored in T335 is an example of "MAC address of target apparatus". The MACte 200 being described in the sender area is an example of "specific content".

(Fourth Embodiment)

In the present embodiment, the content of the process of S30 of FIG. 2, and the content of the determining process of S42 are different from the first embodiment. In S30, the CPU 132 sends a probe response in response to the probe request received in S20 to the terminal apparatus 200 which is the target apparatus. The probe response includes a sender area in which a MAC address of the sender apparatus is to be written, and the MACpr, which is the MAC address of the printer 100, is described in the sender area. Thereby, the terminal apparatus 200 can know the MACpr. Thereafter, the terminal apparatus 200 sends a probe request in which nothing is described in the SSID area. The probe request includes a destination area in which a MAC address of a destination apparatus is to be written, and the MACpr is described in the destination area. The CPU 132 determines YES in S42 in a case where the MACpr is described in the destination area in the probe request received in S40, and determines NO in S42 in a case where the MACpr is not described in the destination area.

(Case A4; FIG. 9)

In the present embodiment, case A4 of FIG. 9 is realized instead of case A1 of FIG. 5. T410 to T434 are the same as T210 to T234 of FIG. 7.

In T435, the printer 100 sends a probe response in which the character string "DIRECT-target" is described in the SSID area, to the terminal apparatus 200 (S30 of FIG. 2). The MACpr is described in the sender area in the response. T440 is the same as T240 of FIG. 7. Information indicating that this is a broadcast is described in the destination area in the request of T440. Even if the request of T440 is received (YES in S40), since the MACpr is not described in the destination area in the request, the printer 100 determines that the terminal apparatus which is the sender of the request is not the target apparatus (NO in S42), and does not send a probe response to the request. Thereby, the phenomenon in which the printer 100 establishes a wireless connection with any of the terminal apparatuses 300, 400 does not occur.

On the other hand, after sending the request of T432, in T450 the terminal apparatus 200 unicasts a probe request in which nothing is described in the SSID area to the printer 100. That is, the MACpr, which is the MAC address of the printer 100, is described in the destination area in the request. Upon receiving the request of T450 (YES in S40), since the MACpr is described in the destination area in the request, the printer 100 determines that the terminal apparatus 200 which is the sender of the request is the target apparatus (YES in S42) and, in T452, sends a probe response to the terminal apparatus 200 (S50). T454 to T482 are the same as T54 to T82 of FIG. 5.

In the present embodiment, also, it is possible to suppress the occurrence of the phenomenon in which the printer 100, while operating in the setting mode, establishes a wireless connection with the terminal apparatuses 300, 400 which are not the target apparatuses. Therefore, the printer 100 can properly establish a wireless connection with the terminal apparatus 200 which is the target apparatus, and consequently can properly receive the wireless information WIap from the terminal apparatus 200.

In the present embodiment, the destination area is an example of "predetermined area". The MACpr is an example of "MAC address of communication apparatus". A state of where the MACpr is described in the destination area is an example of "specific content".

(Modification 1)

The "communication apparatus" is not restricted to the printer 100, but may be a scanner capable of executing a scan function. In this case, a scan engine is used instead of the print engine 118. Further, S152 and S164 of FIG. 3 become a connection scan mode and connection scan process, in S316 of FIG. 4 a scan execution request is received and, in S318, a scan process for causing the scan engine to execute a scan is executed. Then, scan data is sent to the terminal apparatus by using the wireless connection of S314. In the present modification, the connection scan mode, the scan engine and the scan execution request are examples of "second operation mode", "image processing engine" and "execution request", respectively.

(Modification 2)

The "communication apparatus" may be an apparatus which executes a function (for example, display function, calculation function) different from the print function and scan function (for example, PC, server, portable terminal (mobile phone, smartphone, PDA, etc.)). In this case, S150 to S170 of FIG. 3 can be omitted. In the present modification, "second operation mode", "establishing a third wireless connection" and "image processing engine" and "causing the image processing engine to execute the image processing" can be omitted.

(Modification 3)

The "second operation mode" is not restricted to the connection print mode of the embodiments, and the connection scan mode of modification 1 but alternatively, for example, may be a mode for sending a status (for example, remaining amount of consumables, etc.) of the printer 100 to an external device. In this case, instead of S316 and S318 of FIG. 4, the status of the printer 100 is sent to the terminal apparatus 300, and the status is displayed in the terminal apparatus 300. Further, in a case where the "communication apparatus" is an apparatus which executes a function different from the print function and scan function, such as for example, a hard disk device or a speaker, the "second operation mode" may be, for example, a mode for receiving data from an external apparatus, storing the data, and sound-outputting the data.

(Modification 4)

In the first and second embodiments, when power of the CPU 132 is initially turned ON, the printer 100 may automatically operate as the G/O. That is, after S14 of FIGS. 2, S20 to S24 may be omitted, and S30 may be executed immediately. In the present modification, "operating as a parent station of the second wireless network" may be omitted.

(Modification 5)

In S30 of FIG. 2, the CPU 132 may cause the printer 100 to operate as a parent station in accordance with the Soft AP scheme and, in S210 of FIG. 4, may establish a wireless connection in accordance with the Soft AP scheme. Similarly, in S314 of FIG. 4, the CPU 132 may establish a wireless connection in accordance with the Soft AP scheme. That is, the "first wireless connection" and "third wireless connection" are not restricted to a wireless connection in accordance with the WFD scheme, but may be a wireless connection in accordance with another scheme (for example, Soft AP scheme).

(Modification 6)

In S210 of FIG. 4, the CPU 132 may execute the G/O Negotiation and, further, execute the second type of connection process. Further, in a case where the terminal apparatus 200 autonomously operates as the G/O, in S210 the CPU 132 may establish a wireless connection with the terminal apparatus 200 in which the printer 100 operates as a child station. That is, the "first wireless connection" may be a wireless connection in which the communication apparatus operates as a fixed station, or may be a wireless connection in which the communication apparatus operates as a station determined in response to a communication (for example, G/O Negotiation) with the first external apparatus.

(Modification 7)

In S310, S312 of FIG. 5, the CPU 132 may, for example, cause the printer 100 to autonomously operate as the G/O without executing the G/O Negotiation (or the terminal apparatus 300 may operate autonomously as the G/O). That is, the "third wireless connection" may be a wireless connection in which the communication apparatus operates as a fixed station, or may be a wireless connection in which the communication apparatus operates as a station determined in response to communication with a second external apparatus.

(Modification 8)

In S110 of FIG. 3, the CPU 132 may determine YES in S110 in, for example, a case where a near field wireless communication (NFC abbreviation of Near Field Communication) communication, a Blue Tooth (registered trademark) communication, etc.) has been executed, and a signal indicating a start of operation of the setting mode is received from the terminal apparatus 200. In the present modification, the signal is an example of "first instruction". Similarly, the "second instruction" may be a signal received by a near field wireless communication.

(Modification 9)

The "setting information" is not restricted to the wireless information Wlap of the AP 10, but may be for example, information indicating a default print setting, or may be information indicating a telephone book being stored in the terminal apparatus 200. In the present modification, "setting information" does not include "wireless information", and "establishing a second wireless connection with the access point" may be omitted. Generally speaking, "setting information" may be any information to be used (i.e., set) by the communication apparatus.

(Modification 10)

When power of the printer 100 is initially turned ON, the CPU 132 may not execute the process of FIG. 2. In another modification, the CPU 132 may not execute S112 of FIG. 3 at the time of the setting operation. Further, in another modification, the CPU 132 may not execute the processes of S150 to S170 of FIG. 3 at the time of the WFD connection operation. For example, the CPU 132 may regularly operate in the connection print mode.

(Modification 11)

In the above embodiments, each process of FIG. 2 to FIG. 9 is implemented by software (i.e., the programs 140A, 242A). However, at least one process of each process of FIG. 2 to FIG. 9 may be implemented by hardware such as a logic circuit.

What is claimed is:

1. A communication apparatus comprising:
   a wireless interface;
   an image processing engine;
   a processor; and
   a memory comprising a setting area for storing setting information which is to be used by the communication apparatus,
   wherein the memory stores computer-readable instructions therein, and the computer-readable instructions, when executed by the processor, cause the communication apparatus to execute:
   operating in one of a plurality of operation modes including a first operation mode and a second operation mode different from the first operation mode, the first operation mode being for receiving the setting information from a target apparatus so as to store the setting information in the setting area, the target apparatus being to send the setting information to the communication apparatus, the second operation mode being for executing an image processing in response to an execution request of the image processing that is received from an external apparatus, wherein the communication apparatus operates in the second operation mode in a case where a second instruction for causing the communication apparatus to operate in the second operation mode is given under a state where the communication apparatus does not operate in the second operation mode;

determining whether a first external apparatus is the target apparatus by referring content of a predetermined area included in a first connection request in a case where the first connection request is received from the first external apparatus via the wireless interface under a state where the communication apparatus operates in the first operation mode;

wherein the determining includes:
  determining that the first external apparatus is the target apparatus in a case where the content of the predetermined area included in the first connection request is a specific content; and
  determining that the first external apparatus is not the target apparatus in a case where the content of the predetermined area included in the first connection request is different from the specific content;

establishing a first wireless connection with the first external apparatus via the wireless interface in a case where it is determined that the first external apparatus is the target apparatus, wherein a wireless connection with the first external apparatus via the wireless interface is not established in a case where it is determined that the first external apparatus is not the target apparatus;

storing the setting information in the setting area in a case where the setting information is received from the first external apparatus by using the first wireless connection;

in a case where a second connection request is received from a second external apparatus via the wireless interface under a state where the communication apparatus operates in the second operation mode, establishing a third wireless connection with the second external apparatus via the wireless interface, even if a content of a predetermined area included in the second connection request is different from the specific content; and causing the image processing engine to execute the image processing in a case where the execution request is received from the second external apparatus by using the third wireless connection.

2. The communication apparatus as in claim 1, wherein the first wireless connection is established with the first external apparatus by sending a response to the first connection request to the first external apparatus via the wireless interface in the case where it is determined that the first external apparatus is the target apparatus, and a response to the first connection request is not sent to the first external apparatus in the case where it is determined that the first external apparatus is not the target apparatus.

3. The communication apparatus as in claim 1, wherein the setting information includes wireless information being used in a first wireless network formed by an access point, and
the computer-readable instructions, when executed by the processor, causing the communication apparatus to further execute:
  establishing a second wireless connection with the access point via the wireless interface by using the wireless information included in the setting information so as to cause the communication apparatus to participate in the first wireless network as a child station in a case where the setting information is received from the first external apparatus.

4. The communication apparatus as in claim 1, wherein the communication apparatus is caused to operate in the first operation mode until a predetermined period of time has lapsed since the communication apparatus was turned on.

5. The communication apparatus as in claim 1, wherein the communication apparatus is caused to operate in the first operation mode in a case where a first instruction for causing the communication apparatus to operate in the first operation mode is given under a state where the communication apparatus does not operate in the first operation mode.

6. A communication apparatus comprising:
a wireless interface;
a processor; and
a memory comprising a setting area for storing setting information which is to be used by the communication apparatus, the setting information including wireless information being used in a first wireless network formed by an access point,
wherein the memory stores computer-readable instructions therein, and the computer-readable instructions, when executed by the processor, cause the communication apparatus to execute:
operating in one of a plurality of operation modes including a first operation mode for receiving the setting information from a target apparatus so as to store the setting information in the setting area, the target apparatus being to send the setting information to the communication apparatus;
determining whether a first external apparatus is the target apparatus by referring content of a predetermined area included in a first connection request in a case where the first connection request is received from the first external apparatus via the wireless interface under a state where the communication apparatus operates in the first operation mode;
establishing a first wireless connection with the first external apparatus via the wireless interface in a case where it is determined that the first external apparatus is the target apparatus, wherein a wireless connection with the first external apparatus is not the target apparatus;
storing the setting information in the setting area in a case where the setting information is received from the first external apparatus by using the first wireless connection;
establishing a second wireless connection with the access point via the wireless interface by using the wireless information included in the setting information so as to cause the communication apparatus to participate in the first wireless network as a child station in a case where the setting information is received form the first external apparatus; and
operating as a parent station of a second wireless network in a case where a third connection request including a predetermined character string is received from the target apparatus under the state where the communication apparatus operates in the first operation mode,
wherein in a case where the first connection request is received from the first external apparatus and it is determined that the first external apparatus is the target apparatus after the communication apparatus has operated as the parent station of the second wireless network, the first wireless connection is established with the first external apparatus so as to cause the first external apparatus to participate in the second wireless network as a child station.

7. The communication apparatus as in claim 6, wherein the computer-readable instructions, when executed by the processor, cause the communication apparatus to further execute:
storing a MAC address of the target apparatus included in the third connection request in the memory,
wherein the predetermined area included in the first connection request is an area in which a MAC address of a sender apparatus is to be described, and
the determining includes:
determining that the first external apparatus is the target apparatus in a case where a MAC address of the first external apparatus described in the predetermined area is identical with the MAC address of the target apparatus stored in the memory; and
determining that the first external apparatus is not the target apparatus in a case where the MAC address of the first external apparatus described in the predetermined area is not identical with the MAC address of the target apparatus stored in the memory.

8. The communication apparatus as in claim 6, wherein the computer-readable instructions, when executed by the processor, cause the communication apparatus to further execute:
sending a response including a MAC address of the communication apparatus to the target apparatus via the wireless interface in the case where the third connection request including the predetermined character string is received from the target apparatus,
wherein the predetermined area included in the first connection request is an area in which a MAC address of a destination apparatus is to be described, and
the determining includes:
determining that the first external apparatus is the target apparatus in a case where the MAC address of the communication apparatus is described in the predetermined area; and
determining that the first external apparatus is not the target apparatus in a case where the MAC address of the communication apparatus is not described in the predetermined area.

9. The communication apparatus as in claim 6, wherein the first wireless connection is established with the first external apparatus by sending a response to the first connection request to the first external apparatus via the wireless interface in the case where it is determined that the first external apparatus is the target apparatus, and
a response to the first connection request is not sent to the first external apparatus in the case where it is determined that the first external apparatus is not the target apparatus.

10. The communication apparatus as in claim 6, wherein the communication apparatus is caused to operate in the first operation mode in a case where a first instruction for causing the communication apparatus to operate in the first operation mode is given under a state where the communication apparatus does not operate in the first operation mode.

11. A communication apparatus comprising:
a wireless interface;
a processor; and
a memory comprising a setting area for storing setting information which is to be used by the communication apparatus,
wherein the memory stores computer-readable instructions therein, and the computer-readable instructions, when executed by the processor, cause the communication apparatus to execute:
operating in one of a plurality of operation modes including a first operation mode for receiving the setting information from a target apparatus so as to store the setting information in the setting area, the target apparatus being to send the setting information to the communication apparatus;
determining whether a first external apparatus is the target apparatus by referring a content of a predetermined area included in a first connection request in a case where the first connection request is received from the first external apparatus via the wireless interface under a state where the communication apparatus operates in the first operation mode;
wherein the predetermined area included in the first connection request is an area in which an SSID (abbreviation of Service Set Identifier) is to be described, and
the determining includes:
determining that the first external apparatus is the target apparatus in a case where nothing is described in the predetermined area; and
determining that the first external apparatus is not the target apparatus in a case where an operating character string, which indicates that the first external apparatus is operating in accordance with Wi-Fi Direct (registered trademark), is described in the predetermined area;
establishing a first wireless connection with the first external apparatus via the wireless interface in a case where it is determined that the first external apparatus is the target apparatus, wherein a wireless connection with the first external apparatus via the wireless interface is not established in a case where it is determined that the first external apparatus is not the target apparatus; and
storing the setting information in the setting area in a case where the setting information is received from the first external apparatus by using the first wireless connection.

12. The communication apparatus as in claim 11, wherein the first wireless connection is established with the first external apparatus by sending a response to the first connection request to the first external apparatus via the wireless interface in the case where it is determined that the first external apparatus is the target apparatus, and
a response to the first connection is not sent to the first external apparatus in the case where it is determined that the first external apparatus is not the target apparatus.

13. The communication apparatus as in claim 11, wherein the setting information includes wireless information being used in a first wireless network formed by an access point, and
the computer-readable instructions, when executed by the processor, causing the communication apparatus to further execute:
establishing a second wireless connection with the access point via the wireless interface by using the wireless information included in the setting information so as to cause the communication apparatus to participate in the first wireless network as a child station in a case where the setting information is received from the first external apparatus.

14. The communication apparatus as in claim 11, wherein the communication apparatus is caused to operate in the first operation mode in a case where a first instruction for causing the communication apparatus to operate in the first operation mode is given under a state where the communication apparatus does not operate in the first operation mode.

15. A communication apparatus comprising;
a wireless interface;
a processor; and
a memory comprising a setting area for storing setting information which is to be used by the communication apparatus,
wherein the memory stores computer-readable instructions therein, and the computer-readable instructions, when executed by the processor, cause the communication apparatus to execute:
operating in one of a plurality of operation modes including a first operation mode for receiving the setting information from a target apparatus so as to store the setting information in the setting area, the target apparatus being to send the setting information to the communication apparatus;
determining whether a first external apparatus is the target apparatus by referring content of a predetermined area included in a first connection request in a case where the first connection request is received from the first external apparatus via the wireless interface under a state where the communication apparatus operates in the first operation mode;
wherein the predetermined area included in the first connection request is an area in which an SSID (abbreviation of Service Set Identifier) is to be described, and
the determining includes:
determining that the first external apparatus is the target apparatus in a case where a predetermined SSID for identifying a wireless network where the communication apparatus operates as a parent station is described in the predetermined area; and
determining that the first external apparatus is not the target apparatus in a case where the predetermined SSID is not described in the predetermined area;
establishing a first wireless connection with the first external apparatus via the wireless interface in a case where it is determined that the first external apparatus is the target apparatus, wherein a wireless connection with the first external apparatus via the wireless interface is not established in a case where it is determined that the first external apparatus is not the target apparatus; and
storing the setting information in the setting area in a case where the setting information is received from the first external apparatus by using the first wireless connection.

16. The communication apparatus as in claim 15, wherein
the first wireless connection is established with the first external apparatus by sending a response to the first connection request to the first external apparatus via the wireless interface in the case where it is determined that the first external apparatus is the target apparatus, and
a response to the first connection request is not sent to the first external apparatus in the case where it is determined that the first external apparatus is not the target apparatus.

17. The communication apparatus as in claim 15, wherein
the setting information includes wireless information being used in a first wireless network formed by an access point, and
the computer-readable instructions, when executed by the processor, causing the communication apparatus to further execute:
establishing a second wireless connection with the access point via the wireless interface by using the wireless information included in the setting information so as to cause the communication apparatus to participate in the first wireless network as a child station in a case where the setting information is received from the first external apparatus.

18. The communication apparatus as in claim 15, wherein the communication apparatus is caused to operate in the first operation mode in a case where a first instruction for causing the communication apparatus to operate in the first operation mode is given under a state where the communication apparatus does not operate in the first operation mode.

* * * * *

UNITED STATES PATENT AND TRADEMARK OFFICE
CERTIFICATE OF CORRECTION

PATENT NO. : 10,285,027 B2
APPLICATION NO. : 15/279475
DATED : May 7, 2019
INVENTOR(S) : Kunihito Terashita Page 1 of 1

It is certified that error appears in the above-identified patent and that said Letters Patent is hereby corrected as shown below:

In the Claims

Column 24, Claim 12, Line 50:
Please delete "first connection is not" and insert --first connection request is not--

Signed and Sealed this
Third Day of September, 2019

Andrei Iancu
*Director of the United States Patent and Trademark Office*